United States Patent [19]

Green

[11] 4,062,526

[45] Dec. 13, 1977

[54] METHOD OF AND APPARATUS FOR CONDITIONING PULP

[76] Inventor: Charles A. Green, Apartado 82, Parral, Chihuahua, Mexico

[21] Appl. No.: 652,528

[22] Filed: Jan. 26, 1976

[51] Int. Cl.² ............................................. B01F 5/16
[52] U.S. Cl. .................................... 366/171; 366/264
[58] Field of Search .......................... 259/95, 96, 5–8, 259/23, 24, 43, 44; 209/109, 155–161; 266/22

[56] References Cited

U.S. PATENT DOCUMENTS

| 2,738,174 | 3/1956 | Magnant et al. | 259/96 |
|---|---|---|---|
| 3,043,570 | 7/1962 | Seiter | 259/96 |
| 3,414,245 | 12/1968 | Frazer | 261/87 |
| 3,843,101 | 10/1974 | Green | 259/96 |

Primary Examiner—Leonard D. Christian
Attorney, Agent, or Firm—Horace B. Van Valkenburgh; Frank C. Lowe

[57] ABSTRACT

In conditioning pulp, such as ore particles carried by or in suspension in water, or other particles, conditioning prior to flotation involves the addition of one or more reagents to the pulp or the like. By this invention, an agitation and pumping zone, spaced from the bottom of the tank in which the operation is carried out, pumps pulp outwardly in swirling, circumferential streams. A conditioning reagent is supplied to the active area of the pumping zone, such as the center of the zone. The operation may be enhanced by using a pair of pumping zones, one above the other, as well as intercepting the streams of pulp radially outwardly of the pumping zones, as by a stabilizer having radially extending vanes.

15 Claims, 6 Drawing Figures

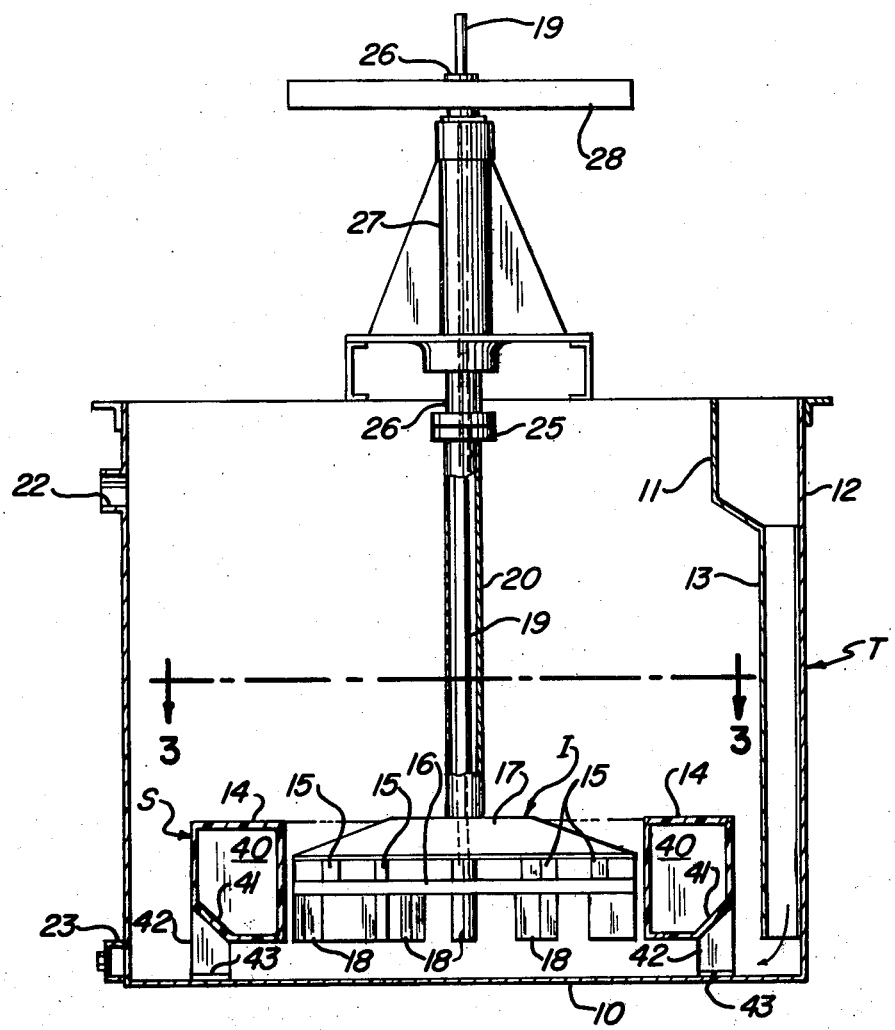
Fig _ 1
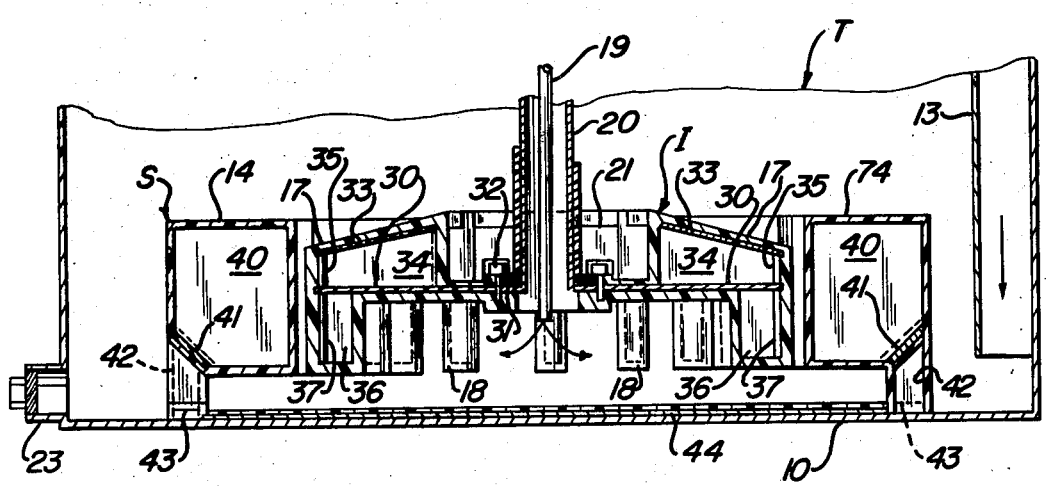
Fig _ 2

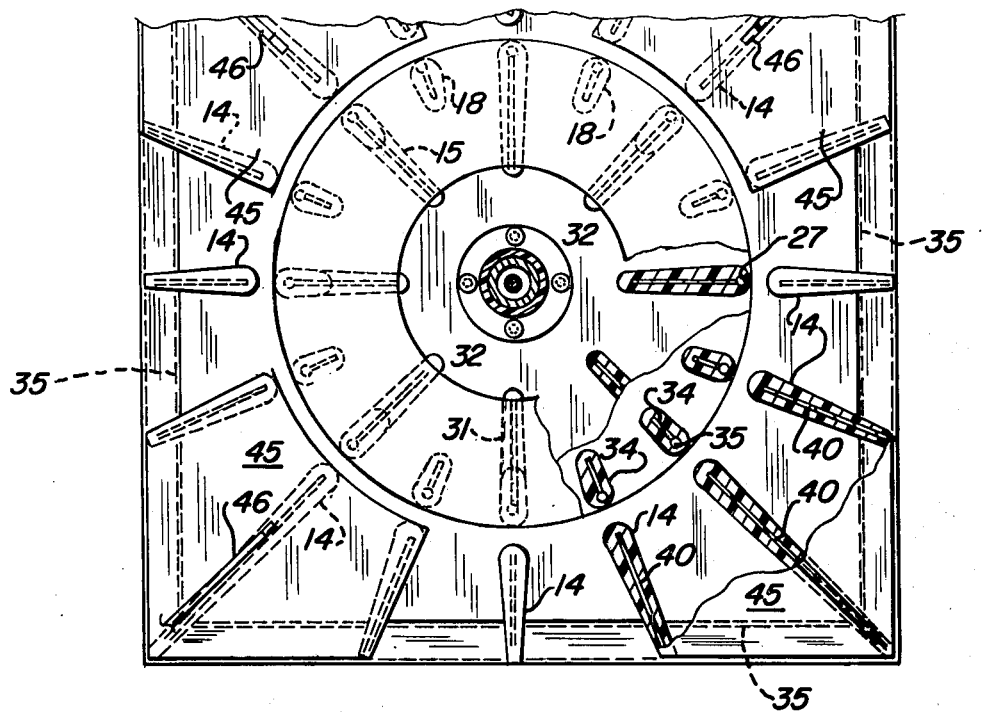
Fig_3
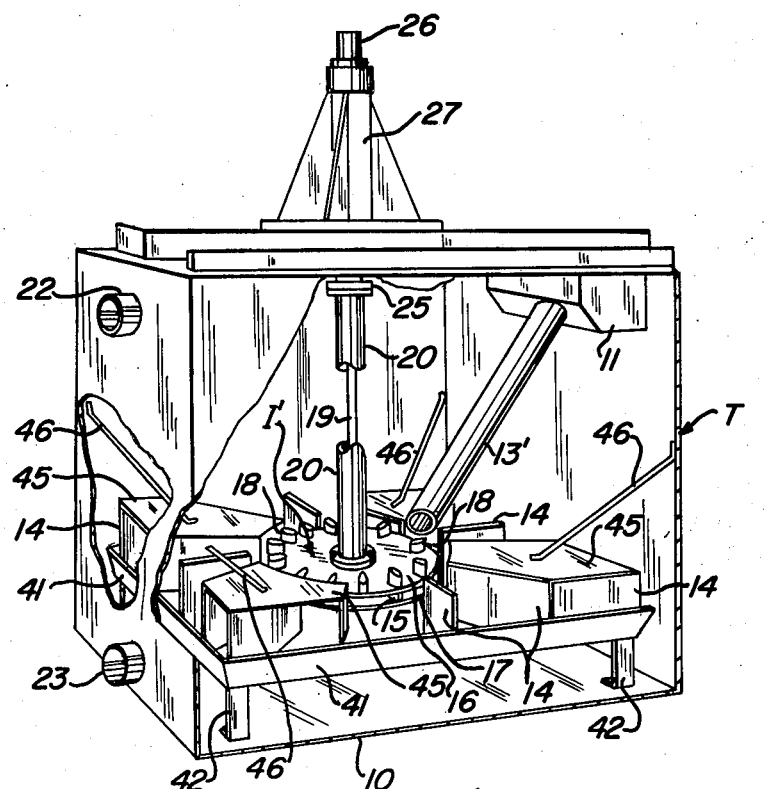
Fig_4

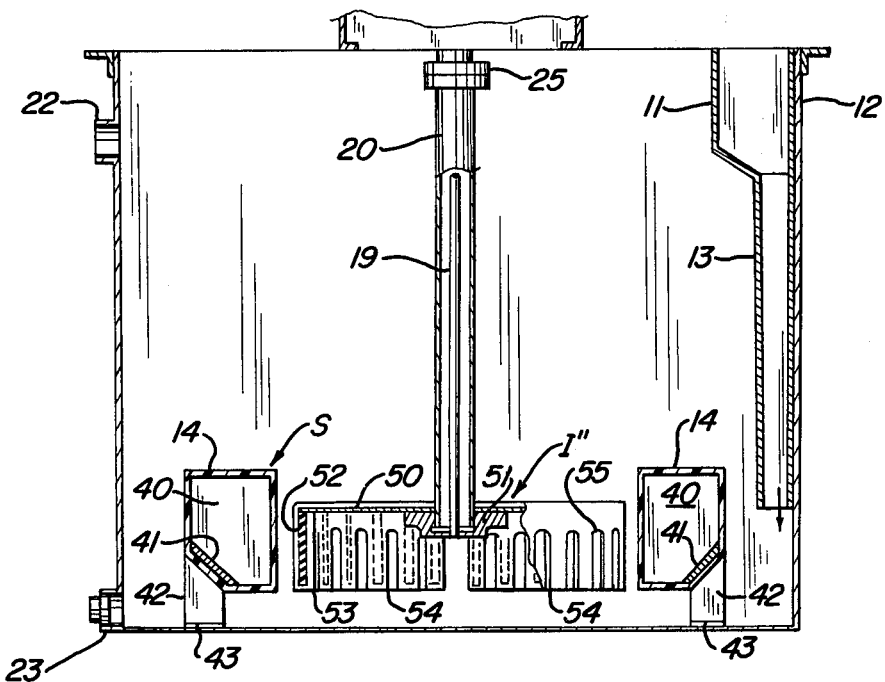
Fig _ 5
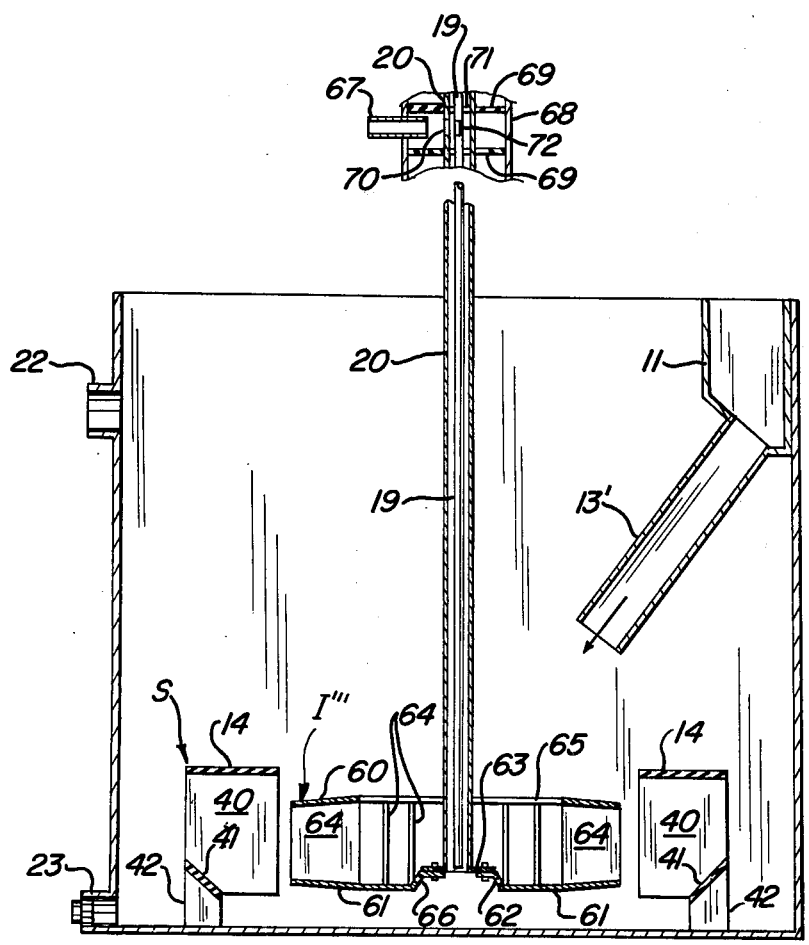
Fig _ 6

METHOD OF AND APPARATUS FOR CONDITIONING PULP

This invention relates to conditioners and methods of conditioning, such as the treatment of particles carried by or in suspension in a liquid, such as water.

Prior to the flotation of desired ore particles, it is customary to treat the pulp containing the ore particles with a reagent which is intermixed with the pulp, sometimes merely increasing the propensity of the particles to be lifted by air bubbles during flotation, or at other times, to treat the liquid and pulp for other purposes, such as to control the pH thereof. The treatment of a liquid carrying particles in suspension may also be carried out for different purposes, as in the reclamation of coal, water purification, reclamation of waste products and the like.

Previously, commercial conditioners for the conditioning of an ore pulp prior to flotation have generally been various types of impellers or agitators, mounted on the lower end of a vertical shaft. The types of impellers or agitators have included angular blade types, curved blade types, spiral turbine blade types, curved paddles extending from the outer edge of a circular plate, and others, including a series of semicircular blades disposed vertically and at spaced radial positions at the lower end of a shaft and connected together at the top and bottom to provide the so-called "egg beater" type. Generally, for such conditioners, the conditioning reagent is merely dumped into the tank at one side or at the position of the inflowing pulp.

It has been found that the flotation apparatus disclosed and claimed in my U.S. Pat. Nos. 3,842,101 of Oct. 22, 1974 and 3,882,016 of May 6, 1975, when utilized as a conditioner, have not only decreased the amount of conditioning reagent used, such as by 20%, but also produced an increase in the recovery of the desired particles through flotation, as on the order of 10%. In using such equipment as a conditioner, it is desirable to introduce the treatment material at the center and on the underside of the impeller. Such treatment materials for flotation include oleic acid, xanthates, frothers, starch solutions, sulfur dioxide gas and others. In the case of sulfur dioxide gas, the gas is introduced not only to lower the pH of the pulp, but also as a sulfidizer and processing agent for the gangue.

The method of conditioning pulp in a tank, in accordance with the present invention, comprises establishing a lower annular zone spaced from the bottom of the tank, for pumping pulp outwardly in swirling, circumferential streams, intercepting the streams of pulp at a position radially outwardly of the pumping zone, to produce agitation of the pulp and mixing of a reagent therewith. The reagent is supplied to the center of the pumping zone, since adequate results have not been obtained in the absence of this step. The pulp may be supplied to the pumping zone by directing the pulp to flow downwardly outside the intercepting area and then along the bottom of the tank to the pumping zone. Or, if the center of the pumping zone is open at the top, the pulp may be directed downwardly into the pumping zone from above. Preferably, two pumping zones in superimposed relation, in each of which pulp is pumped outwardly in swirling, circumferential streams, for interception at a position radially outwardly of the zone, are spaced above the bottom of the tank. In the case of the two pumping zones, the pulp may be supplied along the bottom of the tank to the lower pumping zone and the reagent to the center thereof, or the pulp may be supplied to the center of the upper pumping zone.

The construction of the apparatus by which the above method steps are particularly adapted to be carried out, including preferred details of the construction and additional details of the method of this invention, will become apparent from the description which follows, taken in conjunction with the accompanying drawings, in which:

FIG. 1 is a central vertical section of conditioning apparatus embodying this invention.

FIG. 2 is a fragmentary vertical section, on an enlarged scale, including, in section, an impeller which is shown in full in FIG. 1.

FIG. 3 is a horizontal section, on an enlarged scale, taken along line 3—3 of FIG. 1, with certain parts being broken away to show the construction beneath more clearly.

FIG. 4 is a perspective, partially broken away, of a conditioning machine also constructed in accordance with this invention.

FIG. 5 is a central vertical section of another alternative conditioning machine of this invention.

FIG. 6 is a condensed, central vertical section of a further alternative embodiment of this invention.

The conditioning apparatus illustrated in FIGS. 1 and 2 includes an impeller I mounted centrally for rotation about a vertical axis adjacent but spaced from the bottom 10 of a tank T having a pulp feed trough 11 adjacent one side 12 of the tank and from which a feed tube 13 extends downwardly to a position just outside a stabilizer S which is provided with a series of radial vanes 14 which, in general, change the flow of pulp pumped outwardly from the impeller I from a swirling movement to a more radial movement. The vanes 14 also produce a mixing action between the pulp and conditioning agent. The impeller I includes upright inner vanes 15 which extend radially between an annular central wall 16 and an outwardly and downwardly sloping, annular top wall 17. A series of radially extending fingers 18 depend from the central wall 16. Both the inner vanes 15 and the depending fingers 18 are preferably thinner at their inner edges than their outer edges, as in FIG. 3, with inner vanes 15 preferbly longer in a radial direction than depending fingers 18, but each extends to the outer edge of the impeller.

In pumping the pulp outwardly, the lower, depending fingers 18 receive pulp from a flow along the bottom of the tank from the flower end of feed pipe 13 and also receive the conditioning fluid from the lower end of a pipe 19 which extends centrally of a hollow shaft 20 for the impeller. Pipe 19 preferably terminates at about the level of central wall 16 of the impeller, with the conditioner flowing out of the bottom of the pipe, as indicated by the arrows of FIG. 2. As stated above, the pulp and conditioner are pumped outwardly by the depending fingers 18 to flow outwardly between stabilizer vanes 13, then move upwardly along the sides of the tank. At the same time, pulp is drawn from above the impeller I and through an annular space 21 between the impeller shaft 20 and the inner edge of upper wall 17 of the impeller, to be pumped outwardly by central vanes 15, with stabilizer vanes 14 again intercepting the pulp to change the swirling motion into a radial motion and further mix the conditioning reagent with the pulp. As will be evident, there is normally a recirculation of pulp through the upper portion of the impeller, with eventual discharge of the conditioned pulp through an outlet 22. A drain connection 23, at the bottom of the tank, is normally plugged, as shown.

As indicated, impeller I is rotated by a lower hollow shaft 20 which extends upwardly and essentially centrally of tank T to a coupling 25, for connection to an upper hollow shaft 26 which extends through a bearing structure 27 to a pulley 28 driven in a conventional manner, as by a plurality of belts from a conventional drive motor (not shown). As in FIG. 1, the conditioning reagent feed pipe 20 may extend above the pulley 28.

The impeller I may be constructed, as in FIG. 2, similarly to the impeller of my U.S. Pat. No. 3,843,101, thus comprising a skeleton which includes a lower annular plate 30 connected to a ring 31 by bolts 32, with ring 31 being attached, as by welding, to the lower end of shaft 20. An annular upper plate 33 slants downwardly in an outward direction, so that the distance between plates 30 and 33 is greater adjacent the inner edge of plate 30 than at the outer edge. A series of ribs or plates 34 are attached to and extend radially between plates 30 and 33 and are connected at their outer edges to posts 35 for a purpose described below. A series of depending finger plates 36 are also disposed radially and extend downwardly from the lower plate 30, each being attached to a depending post 37 at the outer edge thereof. The number of finger plates 36 may be double the number of pump ribs 34, so that the finger plates may be placed opposite pump ribs 34, as well as being equally interspersed therebetween. The posts 35 and 37 may be a single post which extends through an appropriate hole in plate 30 for vertically aligned plates 34 and 36. The entire periphery of the impeller I, as well as ring 31, bolts 32 and shaft 20, may be covered with a layer of rubber or plastic, as shown, which resists the scouring action of the ore particles of the pulp.

The stabilizer S surrounds the impeller I in spaced relation thereto, and may include a series of vane plates 40 which extend radially to the rear edge of a series of supporting bars 41 which are disposed in a rectangle and supported at the four corners by brackets 42 provided with lower flanges 43, resting on the bottom 10 of the tank T. Vane plates 40, supporting bars 41 and brackets 42 are covered by an elastomer, as shown, as of rubber of plastic resistant to the scouring action of the pulp particles. A wear plate 44, provided with an elastomer coating, as shown in FIG. 2, may be placed beneath the impeller I and stabilizer S, to decrease wear on the bottom of the tank.

The stabilizer vanes 14 may be found to be sufficiently operative without any covering, although it may be found desirable to provide a cover, such as a series of elastomer covered quadrants 45 of FIG. 3, each of which occupies on the order of 50° of the upper periphery of the stabilizer vanes, each quadrant being, if desired, connected by a rod 46 with the corresponding corner of the tank. The rod 46 is, of course, preferably rubber covered and is attched, as by welding, to the corresponding quadrant and by a rubber covered bolt or the like to the side of the tank. Each quadrant may comprise a plate of the appropriate contour provided with an elastomer cover. In order to maintain the quadrants more securely on top of the vanes 14, each quadrant may be provided with a radial groove on the underside (not shown) in the elastomer cover, which fits over the top of each stabilizer vane 14. Each stabilizer vane 14 is thicker adjacent its inner end than its outer end and the grooves on the underside of quadrants 45 preferably conform to this configuration. The stabilizer vanes may also be provided with an annular cover or a series of concentric rings, as in my aforesaid U.S. Pat. Nos. 3,843,101 and 3,882,016.

The conditioner illustrated in FIGS. 1-3 has been found to produce better results when utilized for a pulp having ore particles of a fine grind therein, such as on the order of −60 mesh, while the modification illustrated in FIG. 4 has been found to produce better results when utilized for a pulp having ore particles of a coarse grind, such as on the order of +60 mesh. This does not means that all particles over 60 mesh should be separated out before the conditioner of FIGS. 1-3 is utilized, or that all particles under 60 mesh should be separated out before the conditioner of FIG. 4 is utilized, but rather than if the particles of −60 mesh predominate, the former should be used, but if particles of +60 mesh predominate, the latter should be used. However, in each instance, the conditioning reagent should be supplied to the center of the impeller to produce adequate results.

In the modification illustrated in FIG. 4, the impeller I' is similar to the impeller I but is placed in an upside-down position, i.e. so that the fingers 18 are on top and the space 21 of FIG. 2 is at the lower center of the impeller, with the former upper wall 17 now being the lower wall, and the vanes 15 extending between the walls 16 and 17, as before. Also, the pulp feed pipe 13' is placed in a different position, being angled inwardly to direct the feed pulp toward the center of the impeller I'. The stabilizer S of FIG. 4 is similar to the stabilizer described previously in connection with FIGS. 1-3, while the quadrant covers 45 and rods 46 which hold the same in position may be similar to those described previously. Again, the impeller I' is mounted for rotation on a lower shaft 20 connected by a coupling 25 with an upper shaft 26 extending through a bearing assembly 27, all as described previously.

The action of the impeller I' of FIG. 4 is somewhat different from the impeller I of FIG. 1, since the feed pipe 13' extends toward the center of the impeller, and the pulp to be conditioned is pumped outwardly by fingers 18 through vanes of the stabilizer S, with one portion being recirculated above the stabilizer and another portion tending to follow along the walls and bottom of the tank to the central hole, for outward pumping and mixing of the conditioner by the vanes 15. The conditioner feed pipe 19 may extend downwardly to a point just below the lower end of lower shaft 20, so that the pulp recirculated by the lower vanes may be exposed to the conditioner then pumped outwardly through the stabilizer vanes and mixed with the conditioner.

The alternative embodiment illustrated in FIG. 5 includes an impeller I" which is similar to the Galagher flotation impeller, and a stabilizer S similar to the stabilizer utilized with the embodiments previously described. If desired, the stabilizer S, particularly the vanes 14 thereof, may be provided with a quadrant cover as illustrated in FIG. 3, or an alternative cover of the types previously referred to. As before, both the impeller I" and stabilizer S are spaced from the bottom of the tank.

The impeller I" may comprise an annular horizontal plate 50 attached to the lower end of a rotatable shaft 20, as by a ring 51. Depending from the outer edge of the disc 50 is a vertical cylinder 52 provided with a series of circumferentially spaced, depending flanges 53. When covered with an elastomer in a manner similar to the constructions previously described, the result is a series of elastomer covered depending fingers 54 with slots 55 therebetween. As before, a feed trough 11 is adapted to supply the feed pipe 13 with pulp which flows downwardly and across the bottom of the tank T, which may also be provided with an elastomer covered false bottom, as described previously. As before, the reagent feed tube 19 extends downwardly, within shaft 20, to the center of the impeller. The rotation of the impeller I″ produces an agitation and pumping action which subjects the pulp and conditioning agent to a vigorous agitation in the area of the fingers 54, and also pumps the pulp mixture, with a swirling motion, outwardly through the vanes 14 of the stabilizer S, for additional agitation, then movement either upwardly into the tank T or, at areas spaced from the feed pipe 13, for flow downwardly along the walls of the tank T and across the bottom, for recirculation by the impeller I″. The alternative embodiment of FIG. 5 has been operated successfully but has been found to require considerably more horsepower than either the apparatus of FIGS. 1-3 or the apparatus of FIG. 4.

The alternative embodiment of FIG. 6 includes an impeller I‴ which is based on the Denver D-R flotation impeller. Again, the impeller I‴ and the stabilizer S are spaced from the bottom of the tank, with the latter supported on brackets 42 and the former supported by and mounted on the lower end of a rotating shaft 20. The impeller I‴ includes an upper annular disc 60 and a lower annular disc 61 provided with a central upturned flange 62 which is attached to the lower end of shaft 20 by means of a ring 63, as by bolts, or in any other suitable manner. A series of radial, upright ribs 64 are attached to and extend between the lower disc 61 and the upper disc 60. The impeller is, as before, covered with a layer of rubber or other elastomer which will withstand the scouring of the pulp, and an annular space 65 surrounds shaft 20 at the position of upper plate 60. The pulp feed to the impeller I‴ is similar to that illustrated in FIG. 4, i.e. an angular feed pipe 13′ extends from the pulp trough 11 downwardly toward the impeller, so that the pulp supplied by the feed trough will pass into the annular hole 65 and be discharged outwardly by the impeller, with a swirling motion. At the same time, the conditioning agent supplied through the feed pipe 19 will be discharged below the impeller, to be drawn into the center of the impeller through spaced holes 66 in flange 62. The pulp discharged through the vanes 14 of the stabilizer S will tend to move upwardly and a portion thereof, except at the area of pipe 13′, then centrally toward the shaft 20 and then downwardly toward the central opening 65 of the impeller, for recirculation and additional mixing of the conditioning agent therewith. The parts of the stabilizer S are also provided with an elastomer covering, although the metal parts are primarily shown.

The embodiment shown in FIG. 6 is a construction adapted to pass gas into the conditioner pipe 19. For this purpose, a stationary supply pipe 67 may extend into a stationary housing 68 which is provided, on the inside, with a pair of spaced seals 69 which permit the shaft 20 to rotate within the stationary housing without leakage of gas. A slot or series of slots 70 in shaft 20 permits the flow of gas from the area within seals 69 through the shaft and into the space surrounding conditioner feed pipe 19. The gas around the feed pipe is contained by spaced annular seals 71 between the feed pipe and the shaft, while the feed pipe is provided with one or more apertures 72, for flow of conditioner into the feed pipe.

In the embodiment of FIG. 6, the pulp through feed pipe 13′ is directed toward the opening 65 in the impeller and moves downwardly in this opening to be propelled outwardly by blades or ribs 64, which impart a swirling motion to the pulp. The vanes 14 of the stabilizer S transform this swirling motion into an outward motion, so that the flow of pulp is outwardly toward the walls of the tank. As the pulp passes into aperture 65, the gas, such as $SO_2$, discharging from the lower end of pipe 19, will enter the pulp through spaced holes 66. Portions of the pulp will undergo several recirculation passages through the impeller, so that a thorough mixing of the conditioning gas with the pulp is obtained before the conditioned pulp flows out through discharge opening 22, since the pulp mixed with gas will tend to be lighter than pulp without gas.

In some instances, as in the case of larger machines, as of 15-foot diameter, the impeller may be used without the stabilizer, but it is necessary that the reagent be fed to a point centrally or beneath the impeller, i.e. to the active area of the pumping zone of the impeller. More than one impeller may be used in one tank and the tank is normally circular, rather than square or rectangular, and also relatively deep, as on the order of 18 to 20 feet.

Although several different embodiments of this invention have been illustrated and described and variations thereof illustrated or indicated, it will be understood that various changes may be made, without departing from the spirit and scope of this invention.

What is claimed is:

1. A method of conditioning pulp in a tank, comprising:
    a. establishing a lower annular zone, spaced from the bottom of said tank, for pumping pulp outwardly in swirling, circumferential streams;
    b. supplying pulp to said zone;
    c. supplying a conditioning reagent to the center of said zone; and
    d. intercepting said streams of pulp at a position radially outwardly of said zone to produce agitation of said pulp and consequent mixing of said reagent therewith.

2. A method as defined in claim 1, including:
    establishing an upper annular zone, contiguous to said lower zone, for pumping pulp outwardly and in swirling, circumferential streams; and
    similarly intercepting said upper streams of pulp radially outwardly of said upper zone to produce agitation of said pulp.

3. A method as defined in claim 2, including:
    introducing said pulp at an area spaced radially outwardly from said lower stream to flow inwardly below said lower stream to an area centrally of said lower pumping zone.

4. A method as defined in claim 1, including:
    establishing a separate annular zone contiguous to said first-mentioned zone for pumping pulp outwardly in swirling, circumferential streams; and
    intercepting said streams of pulp at a position radially outwardly of said second zone, to produce agitation of said pulp and consequent mixing of said reagent therewith.

5. Apparatus for conditioning pulp in a tank, comprising:
    an impeller disposed adjacent but spaced from the bottom of said tank, having agitation and pumping means for receiving pulp and the like centrally and discharging the same outwardly;
means for rotating said impeller about a substantially vertical axis;
means for supplying pulp to said impeller;
means for supplying a conditioning reagent to the center of said agitation and pumping means; and
means surrounding said impeller for receiving a pulp mixture from said agitation and pumping means for interrupting the circular flow of said pulp mixture to produce an intermixing of said pulp with said conditioning reagent.

6. Apparatus for conditioning pulp in a tank, comprising:
an impeller disposed adjacent but spaced from the bottom of said tank, having agitation and pumping means for receiving pulp and the like centrally and discharging the same outwardly;
means for rotating said impeller about a substantially vertical axis;
means for supplying pulp to said impeller;
means for supplying a conditioning reagent to the center of said agitation and pumping means;
means surrounding said impeller for receiving a pulp mixture from said agitation and pumping means for interrupting the circular flow of said pulp mixture to produce an intermixing of said pulp with said conditioning reagent; and
cover means overlying and engaging at least a portion of said interrupting means.

7. Apparatus as defined in claim 6, wherein:
said impeller has a second agitation and pumping means, contiguous to but spaced above said first agitation and pumping means, for receiving centrally pulp, at least a portion thereof having been previously discharged from said first agitation and pumping means and passed through said interrupting means, as well as pulp recirculated from said second agitation and pumping means; and
said interrupting means is constructed and arranged also to intercept the circular flow of pulp mixtures discharged by said second agitation and pumping means.

8. Apparatus as defined in claim 7, wherein:
said impeller is provided with a pair of spaced, annular plates;
upright pumping vanes extend radially and are disposed between said plates; and
a series of fingers extend vertically from one of said plates.

9. Apparatus as defined in claim 8, wherein:
said impeller has a cover of an abrasion resistant material, with said cover of said vanes providing a greater thickness adjacent the outer edge thereof than adjacent the inner edge thereof; and
said cover of said fingers provide a greater thickness adjacent the outer edge than adjacent the inner edge.

10. Apparatus as defined in claim 9, wherein:
said fingers depend from the lower of said plates; and
said vanes extend between said lower plate and an upper plate having a central orifice therein through which pulp for recirculation may flow to said vanes.

11. Apparatus as defined in claim 9, wherein:
said fingers upstand from the upper of said annular plates; and
said vanes extend between said lower plate and an upper plate, said lower plate having a central orifice through which pulp may flow to said vanes.

12. Apparatus as defined in claim 5, wherein:
said pulp receiving and interrupting means surrounding said impeller includes upstanding radial vanes provided with an elastomer covering which is molded to provide a greater thickness adjacent the inner edge of said upstanding vanes than adjacent the outer edge thereof.

13. Apparatus as defined in claim 7, including:
a hollow shaft for rotating said impeller; and
a feed pipe for said reagent extending through said hollow shaft to said impeller.

14. Apparatus as defined in claim 6, wherein:
said impeller comprises a circular top through which extends a pipe for supplying conditioning reagent to the underside of said impeller; and
a series of spaced flanges depending from th outer edge of said top.

15. Apparatus as defined in claim 6, wherein:
said impeller includes an upper annular disc and a lower annular disc, with a series of upright ribs extending between said discs;
said upper annular disc has a central opening to receive pulp and recirculated pulp mixture;
a hollow shaft for rotating said impeller extends through an opening in said upper annular disc for attachment to said lower annular disc;
a pipe, for supplying reagent to the underside of said impeller, extends through said shaft to the lower end thereof; and
said lower annular disc has apertures laterally from said shaft for flow of reagent to the center of said impeller.

* * * * *